US012656776B2

(12) United States Patent
Mentjes et al.

(10) Patent No.: US 12,656,776 B2
(45) Date of Patent: Jun. 16, 2026

(54) ASSISTANCE INSTALLATION AND METHOD FOR ASSISTING VESSELS IN MANEUVERING AT BERTHINGS

(71) Applicant: DEUTSCHES ZENTRUM FÜR LUFT- UND RAUMFAHRT E. V., Bonn-Oberkassel (DE)

(72) Inventors: Jan Mentjes, Oldenburg (DE); Hilko Wiards, Oldenburg (DE); Sebastian Feuerstack, Oldenburg (DE)

(73) Assignee: DEUTSCHES ZENTRUM FÜR LUFT—UND RAUMFAHRT E. V., Bonn-Oberkassel (DE)

( * ) Notice: Subject to any disclaimer, the term of this patent is extended or adjusted under 35 U.S.C. 154(b) by 349 days.

(21) Appl. No.: 18/173,465

(22) Filed: Feb. 23, 2023

(65) Prior Publication Data

US 2024/0288866 A1    Aug. 29, 2024

(51) Int. Cl.
G05D 1/00        (2024.01)
B63B 79/15       (2020.01)
B63B 79/40       (2020.01)

(52) U.S. Cl.
CPC ........... G05D 1/0206 (2013.01); B63B 79/15 (2020.01); B63B 79/40 (2020.01)

(58) Field of Classification Search
CPC ...... G05D 1/0206; B63B 79/15; B63B 79/40; B63B 49/00

(Continued)

(56) References Cited

U.S. PATENT DOCUMENTS 3,690,767 A * 9/1972 Missio .................. G01S 17/875
                                                    356/28
2009/0281686 A1* 11/2009 Smith .................... G01B 21/32
                                                    701/21

(Continued)

FOREIGN PATENT DOCUMENTS

CN        103901806 B        1/2017
EP          4495912 A1 *     1/2025  ............. B63B 79/10
WO   WO-2022249630 A1 *     12/2022  ............. B63B 49/00

OTHER PUBLICATIONS

Athavale et al: "Low cost solution for 3D mapping of environment using 1D LIDAR for autonomous navigation", IOP Conf. Series: Materials Science and Engineering 561, 2019.

(Continued)

*Primary Examiner* — Fadey S. Jabr
*Assistant Examiner* — Paula L Schneider
(74) *Attorney, Agent, or Firm* — WCF IP

(57)                ABSTRACT
An assistance installation unit for berthings of vessels in a water area includes a sensor data processing unit, a plurality of distance sensors spaced apart along the berth, a stationary radio data communication unit, and environmental measurement sensors that measure wind, tide and water current. The distance sensors are adapted to detect a group of reflection points at which a distance measurement signal emitted from the distance sensor is reflected by the vessel to be supported in measurement cycles, and to detect the reflection points as measurement points for the actual distance of the reflection point from the respective distance sensor. A portable data processing unit, which receives the sensor data, is used to display an actual position, orientation and motion of the vessel and of the measured environmental conditions to assist in maneuvering of the vessel.

14 Claims, 5 Drawing Sheets

(58) Field of Classification Search
USPC ........................................................ 701/21
See application file for complete search history.

(56) References Cited

U.S. PATENT DOCUMENTS

| | | | | |
|---|---|---|---|---|
| 2018/0120432 | A1* | 5/2018 | Misra | G01J 3/0294 |
| 2021/0295709 | A1* | 9/2021 | Mannering | G01S 17/08 |
| 2022/0351523 | A1* | 11/2022 | Kim | G06V 10/82 |
| 2023/0131474 | A1* | 4/2023 | Pecota | G06F 3/04842 |
| | | | | 701/21 |
| 2023/0219678 | A1* | 7/2023 | Rezac | B60P 3/1075 |
| | | | | 701/1 |

OTHER PUBLICATIONS

Corso et al: "A Survey of Algorithms for Black-Box Safety Validation of Cyber-Physical Systems", Journal of Artificial Intelligence Research 72, p. 377-428, 2021.
Felski et al: "Present Status and Tendencies in Docking Systems' Development", Annual of Navigation, p. 35-48, 2014.
Hsu: "Assessing the Safety Factors of Ship Berthing Operations", The Journal of Navigation 68, p. 576-588, 2015.

* cited by examiner

ASSISTANCE INSTALLATION AND METHOD FOR ASSISTING VESSELS IN MANEUVERING AT BERTHINGS

FIELD OF THE INVENTION

The invention relates to an assistance installation for assisting vessels in maneuvering at berthings in a water area adjacent to a berth.

The invention further relates to a method for assisting vessels in maneuvering at berthings in a water area adjacent to a berth by use of an assisting installation.

BACKGROUND OF THE INVENTION

An increasing amount of goods to be transported around the globe resulted in continuously increasing ship dimensions. Since 1996, container vessels' size has increased by 90%. Maneuvering in such dense traffic and in ports areas becomes more challenging the bigger a vessel is. Ports are limited in their growth and cannot be expanded at will. Space in harbors is often limited and areas are difficult to overlook and to access. Sometimes even full ship rotations need to be performed in narrow port basins. Stringent time slots and high workload of ship masters and pilots to coordinate supporting tugboat actions increases the likelihood of accidents resulting in damage to ships and port infrastructure. Maintenance of damages to port infrastructure might hinder port access for long periods of time. Because of this, berthing maneuvers are considered to be a highly complex task.

To support captains and pilots in challenging berthing maneuvers, Berthing Aid Systems (BAS) are being developed to enhance their situational awareness in high-workload situations. In general, two different approaches for BAS can be distinguished.

A. Felski; K. Naus; S. Swierczynski; M. Waz; P. Zwolan: "Present Status And Tendencies In Docking Systems' Development", in Annu. Navig. 2014, 21 describes ship-based systems and shore-based assistance systems. Ship-based systems enhance vessels with sensor technology, such as port radars and Portable Pilot Units (PPU) that connect to on-board systems to create situational pictures based on GPS and automatic identification system (AIS) information to support pilots during their assistance.

A. Harati-Mokhtari; A. Wall; P. Brooks; J. Wang: "Automatic Identification System (AIS): Data Reliability and Human Error Implications", in: J. Navig. 2007, 60, 373-389 describes AIS, an automated vessel tracking system that communicates a vessel's unique identification, position, course, and speed in certain time slots.

Shore-based systems depend on sensors installed at the shore. They integrate sensors, such as LiDAR (LiDAR="light detection and ranging" or "laser imaging, detection, and ranging"), into quay walls to measure the distance to approaching ships. LiDAR technology typically offers centimeter precise distance accuracy by emitting light pulses, which are reflected by the targeted objects, while also archiving a high angular resolution in contrast to radar solutions, such as automotive mmWave radar.

Bialer, O.; Jonas, A.; Tirer, T. Super Resolution Wide Aperture Automotive Radar. IEEE Sens. J. 2021, 21, 17846-17858 discloses the state of the art of LiDAR sensors typically offering centimeter precise distance accuracy by emitting light pulses, which are reflected by the targeted objects, while also archiving a high angular resolution.

The distance is determined according to the Time of Flight (TOF) and the speed of light by measuring the time between sending and receiving the reflected pulse. This is described, for example, in R. Athavale; D. S. H. Ram; B. Nair: "Low Cost Solution for 3D Mapping of Environment Using 1D LIDAR for Autonomous navigation", in: IOP Conference Series: Materials Science and Engineering; IOP Publishing: Bristol, UK, 2019; Volume 561, p. 012104.

In the case of 1D LiDAR sensors, light pulses are directed to a single target point destination so that the distance then is measured. The 2D and 3D LiDAR sensors extend this approach by additionally considering horizontal (2D) and vertical (3D) distance measurements. These measurements are displayed on huge screens installed in the sight of the pilot close to the berthing location or are digitally transmitted to a pilot PPU to support berthing maneuvers. This is described in "Trelleborg Smart Dock Laser", https://www.trelleborg.com/en/marine-and-infrastructure/products-solutions-and-services/marine/docking-and-mooring/docking-aid-system/smart-dock-laser and "DockAssist®. The Most Advanced Berthing Aid System in the World", Metratek Telematics Ltd.: Nicosia, Cyprus; https://metratek-.co.uk/dockassist.

Shore-based systems have the advantage that they do not need vessels to be equipped with additional systems. Assistance systems are often considered as safety-critical systems if system failures result in substantial damage to people, property, or the environment (i.e., pollution). This is addressed in W.-K. K. Hsu: "Assessing the Safety Factors of Ship Berthing Operations", in: J. Navig. 2015, 68, 576-588. System verification and validation is therefore an essential part of the system engineering process to proof system dependability properties, such as availability, reliability, and safety. However, if non-deterministic approaches or black-box methods are used, the functional safety can hardly be assured (D. Reiher; A. Hahn: "Review on the Current State of Scenario- and Simulation-Based V&V in Application for Maritime Traffic Systems", in IEEE: Piscataway, NJ, USA, 2021).

In the former case, the algorithms generate a different result for the same input, making them difficult to test.

A. Corso; R. J. Moss; M. Koren; R. Lee; M. J. Kochenderfer: "A Survey of Algorithms for Black-Box Safety Validation", in J. Artif. Intell. Res. 2021 describes that in black box methods, the internal implementation is not accessible for inspection, so it is not possible to understand how the system generates the output.

System reliability, thus, is the ability of a system to deliver its services as specified, and is therefore of major importance. The conditions for the functionality of the system and the range in which it must operate must therefore be constrained to ensure high reliability within the system specifications.

CN 103901806 B discloses an intelligent ship berthing assistance system and method based on various sensors. The system comprises an information real-time acquisition subsystem, a data real-time processing subsystem and an information real-time issue subsystem. Data such as three-dimensional laser-point cloud, video images and environment parameters are acquired in real time through the information real-time acquisition subsystem, data real-time processing is carried out through the data real-time processing subsystem, the real-time ship distance, the berthing speed, the berthing angle, a wharf and ship three-dimensional model, the video images, the environment parameters, berthing suggestions, warning information and the like needed by ship berthing are acquired and are then issued to a user terminal through the information real-time issue subsystem.

SUMMARY OF THE INVENTION

According to one aspect of the invention, the assistance installation for assisting vessels in maneuvering at berthings in a water area adjacent to the berth, comprises:

a sensor data processing unit, a plurality of distance sensors spaced apart along the berth and connected to the sensor data processing unit, a stationary radio data communication unit connected to the sensor data processing unit, environmental measurement sensors connected to the sensor data processing unit and adapted to measure environmental conditions selected from the group of at least wind, tide and water current, and a portable data processing unit having a display and a mobile radio data communication unit adapted for radio data communication with the stationary radio data communication unit.

The distance sensors are adapted to detect a group of reflection points at which a distance measurement signal emitted from the distance sensor is reflected by the vessel to be supported in measurement cycles, and to detect the reflection points as measurement points for the actual distance of the reflection point from the respective distance sensor.

The sensor data processing unit is adapted to determine the actual distance of the ship to be supported from the berth by filtering the measuring points detected by the distance sensors in a measuring cycle, in that a plurality of vertical reference points are virtually established in the measuring range detectable by the distance sensors at a distance from one another at the berth, which reference points have a reference measuring range with a reference length extending perpendicularly from the water area to the berthing point and a reference width oriented transversely thereto, and at least one horizontal reference point with a reference measuring range having a reference length extending parallel to the berth and a reference width extending in the direction transverse to the berth.

The sensor data processing is adapted to evaluate only the measuring points within the respective predetermined reference measuring range for the reference points and the measuring point in a reference measuring range with the smallest perpendicular distance to the respective reference point is detected as the actual distance from the associated reference point.

The portable data processing unit is arranged to display the actual position, orientation and motion of the vessel and of the measured environmental conditions to assist in maneuvering of the vessel.

According to another aspect of the invention, a method for assisting vessels in maneuvering at berthings in a water area adjacent to the berth by use of an assisting installation comprising a sensor data processing unit, a plurality of distance sensors spaced apart along the berth and connected to the sensor data processing unit, a stationary radio data communication unit connected to the sensor data processing unit, environmental measurement sensors connected to the sensor data processing unit and adapted to measure environmental conditions selected from the group of at least wind, tide and water current, and a portable data processing unit having a display and a mobile radio data communication unit adapted for radio data communication with the stationary radio data communication unit, is proposed, wherein the method comprises the steps of:

detecting a group of reflection points at which a distance measurement signal emitted from the distance sensor is reflected by the vessel to be supported;

detecting the reflection points as measurement points for the actual distance of the reflection point from the respective distance sensor;

determining the actual distance of the ship to be supported from the berth by filtering the measuring points detected by the distance sensors in a measuring cycle, by virtually establishing a plurality of vertical reference points in the measuring range detectable by the distance sensors at a distance from one another at the berth, which reference points have a reference measuring range with a reference length extending perpendicularly from the water area to the berthing point and a reference width oriented transversely thereto, and at least one horizontal reference point with a reference measuring range having a reference length extending parallel to the berth and a reference width extending in the direction transverse to the berth;

evaluating only those measuring points within the respective predetermined reference measuring range for the reference points;

selecting the measuring point in a reference measuring range with the smallest perpendicular distance to the respective reference point as the actual distance from the associated reference point; and displaying the actual position, orientation and motion of the vessel and of the measured environmental conditions on the display of said portable data processing unit to assist in maneuvering of the vessel.

The present invention provides an improved assistance installation, which is independent of the vessel and supports safe berthing of a vessel within a Berthing Support Area BSA.

In one embodiment, the sizes of the reference measurement areas are variably adjusted depending on the environmental conditions measured with the environmental sensors, said environmental condition data having an influence on the manoeuvring behaviour of the vessel.

The reference measurement areas can be virtually defined within the detection area of the plurality of distance sensors installed e.g. on a quay wall.

In one embodiment, the sensor data processing unit is adapted to determine a berthing support area as a spatial area in the water area adjacent to the berth from control parameters for the vessel to be assisted, from design parameters of the vessel to be assisted, and from environmental parameters.

The determination of a berthing support area BSA allows to set the support area, in which a reliable support of the vessel manoeuvre is safeguarded.

The sensor data processing unit can be adapted to determine the approach speed and approach acceleration of the vessel from the change in a sequence of measured actual distances to the respective reference points.

The change of a respective distance in time, e.g. the derivative of the determined displacement vector of a location of the vessel, can be easily calculated to obtain the vessel speed. Calculating of the second derivative results in the acceleration of the vessel.

The portable data processing unit can be adapted to display a berthing location at the berth and the actual position and location of the vessel to be assisted from the actual distances, approach speeds and approach accelerations of the vessel to be assisted with respect to the respective reference points, wherein said displayed data are transmitted to the portable data processing unit from the sensor data processing unit via the stationary radio data communication unit to the mobile radio data communication unit of the portable data processing unit.

The portable processing unit can be located on the maneuvering vessel to visually support the captain of pilot. The support data can be transferred with a time stamp, preferably in real time, by the stationary radio data communication unit connected to the sensor data processing unit to the portable data processing unit. The portable processing unit is independent of the ship's equipment.

In one embodiment, the assistance installation further comprises an Automatic-Identification-System (AIS) receiving unit for receiving AIS data of the vessels located in the vicinity of the assistance device for detecting the position, destination and characteristic of the respective one, and wherein the portable data processing unit is arranged for displaying the vessels determined from the received AIS data with their respective positions and sailing directions.

The use of additional information of the vessel in the surrounding of the assistance installation provided in the radio transmitted AIS signals of commercial vessels allows the evaluation of potential dangerous situations or restrictions to the berthing procedure.

The berth can be a quay wall in a harbour, ship canal or lock (i.e. sluice). The maneuver of the vessel does not necessarily require berthing at a berth. The support of the vessel's maneuver can also be carried out while driving along e.g. a hazardous area like a small canal or along a floodgate or lock-wall. In this case, the distance of the vessel to the hazardous area is measured and displayed on the portable computer for navigation, e.g. with pilot support.

BRIEF DESCRIPTION OF THE DRAWINGS

The invention is disclosed by the exemplary embodiment in the enclosed drawings. It shows.

DETAILED DESCRIPTION OF THE INVENTION

Figure 1:
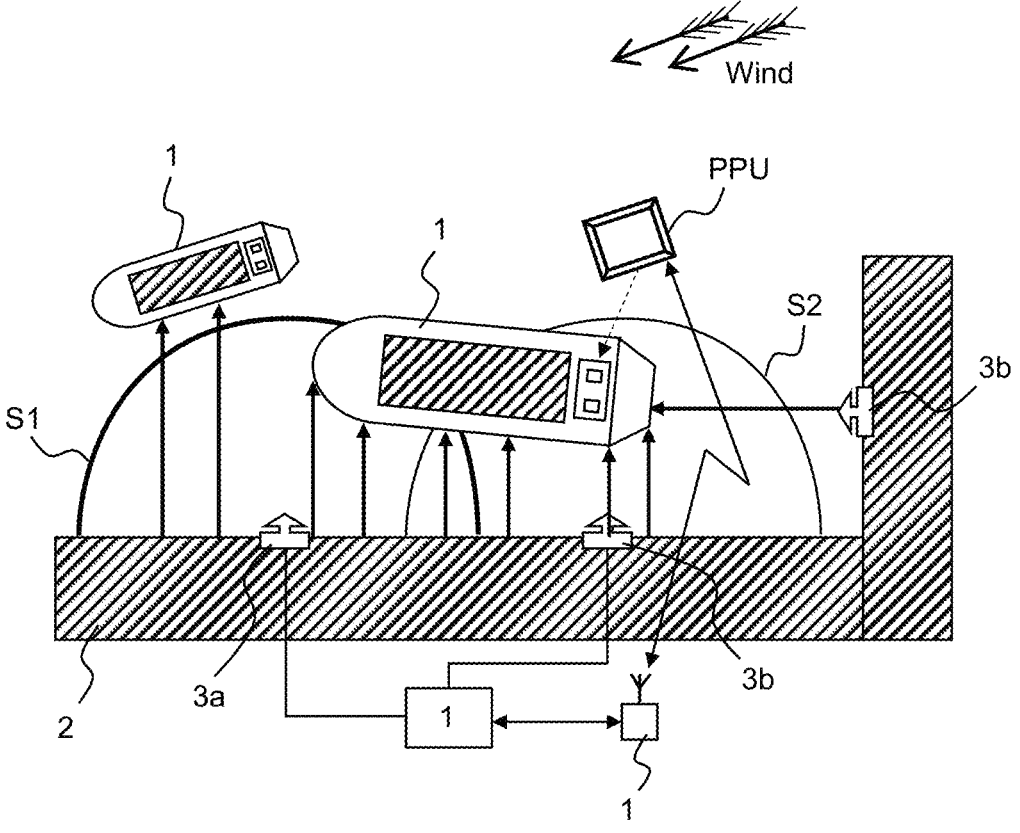
FIG. 1—Schematic illustration of a harbor area with a vessel berthing on a quay wall.

FIG. 1 presents a schematic illustration of a harbor area with a vessel 1 berthing on a quay wall 2. A plurality of distance sensors 3 are mounted on the quay wall 2. The distance sensors 3 are directed to the water area W adjacent to the quay wall 2 and are arranged to measure the distance of vessels 1 within a respective sensor range S1, S2.

For illustration purposes of the complexity, a second vessel 1b heading along the berthing vessel 1 in the maneuvring area is shown.

The distance sensors 3a-3c cannot be placed at arbitrary locations on the quay wall 2. Limited availability of cable niches, the dangers of mooring lines, high tides or flooding situations, and sight blocking fenders limit installation locations. In addition, the fixed range measurement locations limit BAS support to vessels of a certain predefined size to obtain appropriate bow and stern distance measurements of a vessel.

In the exemplary embodiment, LiDAR sensors are used for distance sensors 3a, 3b, 3c and are installed on the quay wall 2 and measure the distance, speed, and heading of the vessel 1.

Additionally, an Automatic Identification System (AIS) can be used to detect incoming vessels at an early stage to provide distance information beyond the range of the LiDAR sensors 3a-c.

Environmental information can be collected by Environmental Measurement Sensors 4 through the integration of wind, wave, tide, and current information. In particular, wind and current sensors can be used to provide context information for pilots.

Moreover, audio and video data can be recorded by a camera 5 to enable monitoring of the berthing location.

The meter markings and individual spots (such as specific fenders and constructions on the quay) transpired to be the main source of orientation with which the pilots visually estimate the vessels' positioning and orientation in relation to a quay.

Therefore, the assistance installation makes preferably use of Reference Points RP that are aligned to the meter markings to ease and improve the situation awareness of the pilots with respect to the perpendicular distance and berthing approach velocity in relation to a quay wall 2.

Current PPU systems calculate this information based on the AIS data and the topographic information encoded into an electronic chart. Because the AIS data sending frequency is connected to the actual speed over ground SOG of a vessel 1 (which, in general, means that less SOG results in less AIS updates), the distance and approach speed calculation measurements are considered as very unreliable by the pilots as their readings significantly jump, become impacted by deteriorating GPS information caused by signal disturbances close to port constructions, and become less frequent with minor speed the closer the vessel is to approaching a quay.

Current maritime radar systems, which are installed on vessels or at the port, do not offer an appropriate minimal detection range and resolution to support berthing.

The technical concept of the Reference Points RP originates from the way 1D LiDAR sensors work. These emit a light pulse that is reflected by the targeted object. The distance is then measured using the time deviation between emitting and receiving the light pulse, using the speed of light. In some cases, LiDAR sensors can receive multiple echoes of an emitted light pulse. Based on the opening beam of the laser, an object can thus reflect several light beams, so that several distances are measured. Finally, the sensors' software decides which distance to use. Thus, the first echo corresponds to the shortest distance, the last to the maximum distance measured.

Similar to this approach, a Reference Point RP also considers a set of data points. However, instead of the individual LiDAR spot reflection echoes (which are handled in the sensors firmware), it calculates the perpendicular distance and approach speed from the quay to a vessel's hull based on a set of LiDAR spots.

Figure 2:
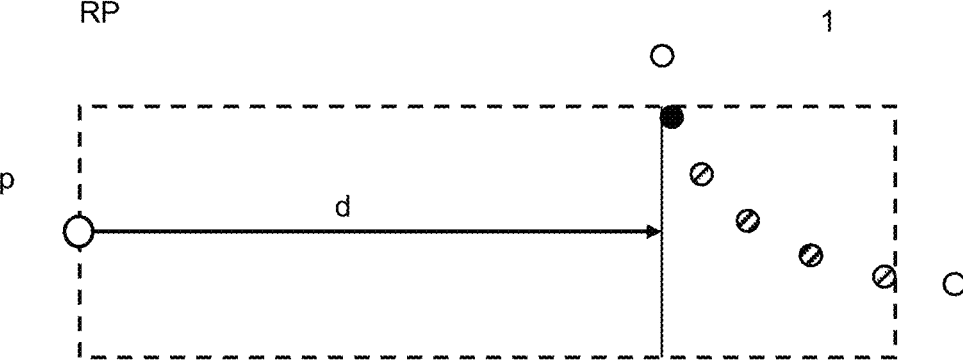
FIG. 2—Diagram of a reference area for determining the actual distance of a vessel to the reference point.

FIG. 2 shows a diagram of a reference area for determining the actual distance of a vessel 1 to the reference point RP. The structure of a Reference Point RP consists of an origin point p (left side) and a filter box (i.e. the reference area) defined by its length l and the width w. The point cloud is shown as dots, where five of seven points are in the filter. If points are detected inside the filter, the distance to each point is calculated. These points are indicated by a pattern.

As it can be seen in the figure, the perpendicular distance, which determines the distance at a right angle to the Reference Point is considered as the distance of the vessel 1 to the quay wall 2. The point with the smallest perpendicular distance d to p sets the distance that is then reflected by the Reference Point. Therefore, based on the working principle of LiDAR sensors, the first echo is used as the output distance. Changes in the distance are used to calculate a vessels' velocity and acceleration relative to the quay 2.

Reference Points RP are defined for positions for that detailed distance and relative speed calculations are relevant. For instance, for port entries and locks, they can support identification of approach angles and check for appropriate speeds. Coupling them with landmarks, such as cranes, quay meter marks, or fenders cases sailing by sight during the very last meters of an approach. Depending on the minimum ship length that the assistance installation (i.e. the Berthing Aid System BAS) is to support, at least three Reference Points RP per minimum ship length should be placed evenly distributed along the quay. This ensures that a vessels' bow and stern can be tracked during the entire berthing process even with steeper and uncommon berthing angles. In addition, the detection of bow and stern allows the determination of the angle of approach, which in turn can be used to determine the Rate of Turn (ROT).

In the following, the deterministic, ship-independent, and shorebased Berthing Aid System BAS using the distance sensors 2, e.g. LiDAR sensors is described in more detail. The assistant installation implements Reference Points RP placed in line with the positioning marks of a quay wall 2 to measure and communicate the distance, speed, and acceleration of an object, e.g. a vessel 1, in relation to a quay wall 2 to a pilot's Portable Pilots Unit PPU. At the same time, the algorithm for determining the position of the object and distance to the quay wall 2 is combined with the determination of an area in which functional safety can be ensured. The goal is to secure the system by defining the Operational Design Domain ODD based on vessel and environmental characteristics, expressed as a well-defined polygon.

The assistant installation exemplarily described above is designed based on interviews that were performed with pilots (harbor and port access pilots) and also considers the relevant regulations, guidelines and common practice to derive the requirements for a shore-based Berthing Aid System BAS.

The main tasks of pilots during berthing can be summarized as follows:

Conducting a berthing maneuver involves three basic subsequent tasks: initial preparations (e.g., requesting pilot support, positioning crew for observation, configuring the bridge system, and connecting the pilot plot), performing the berthing maneuver, and finally berthing the ship.

The most relevant information for the berthing maneuver are the berthing speed for stern and bow and the corresponding distances to the quay combined with information about changes in velocity and the actual absolute position of the ego ship. Further on, wind speed and direction and significant changes of those (e.g., changes can occur during bridge passing or at locations with heavy gusts of wind), as well as currents and the tidal system are also required to be carefully observed by the pilots. For this contribution, the Berthing Aid System BAS should support pilots in observing the ego vessel.

Berthing areas in highly frequented ports are identified by meter markings that appear every 10-15 m and there are strict rules that require a vessel 1 to stop exactly at meter mark zero ("red flag") with a targeted discrepancy of less than 2 m.

System integrity is a most important acceptance factor for a berthing support assistant. The BAS should only communicate information if it is 100% sure. In situations with less confidence, it should simply communicate no information at all.

The most important and challenging guidelines and common practices are the PIANC Guidelines for the Design of Fender Systems considering berthing velocities from 0.08 m/s (over 50,000 DWT under favorable conditions) up to a maximum of 0.6 m/s for vessels under 10,000 DWT under unfavorable conditions). Berthing angles are assumed to be below 6 degrees F. or vessels larger than 50,000 DWT and for smaller vessels (mainly those without tug boat assistance) between 10 and 15 degrees. Average berthing velocities (i.e., perpendicular approach speed to quay) are reported between 0.051 m/s (200 m) and 0.057 m/s (400 m) with outliers up to 0.2 m/s. Average berthing angles are between 0.34 degree (200 m) and 0.18 degree (400 m) with outliers up to 1.25 degree (300 m), respectively. Specifically, for larger vessels, a steep berthing angle up to 5° would result in overhanging, curved hull sections of the ship, and would add additional risk for damage of constructions and crane systems located at the pier area.

A sensing distance of 100-120 m (four times the width of a vessel) is a preferred distance in that the pilots start to observe the approach in relation to the quay.

IMO Regulations Integrity has been defined as "The ability to provide users with warnings within a specified time when the system should not be used for navigation" in the IMO Resolution A.915 (22). For port navigation, the resolution defines an alert limit (AL) of 2.5 m, a time to alarm (TTA) of 10 s, and an integrity risk of 10-5 per 3 h as the main system integrity parameters. The integrity risk is defined as "The probability that a user will experience a position error larger than AL being raised within the specified TTA at any instant of time at any location in the coverage area." Besides integrity, the IMO states an absolute horizontal accuracy of 1 m as a minimum maritime user requirement for general navigation in ports together with service level parameters for an availability of 99.8% (per 30 days), a continuity of 99.97% per 3 h, and a position fix interval of 1 s for port navigation.

Figure 3:
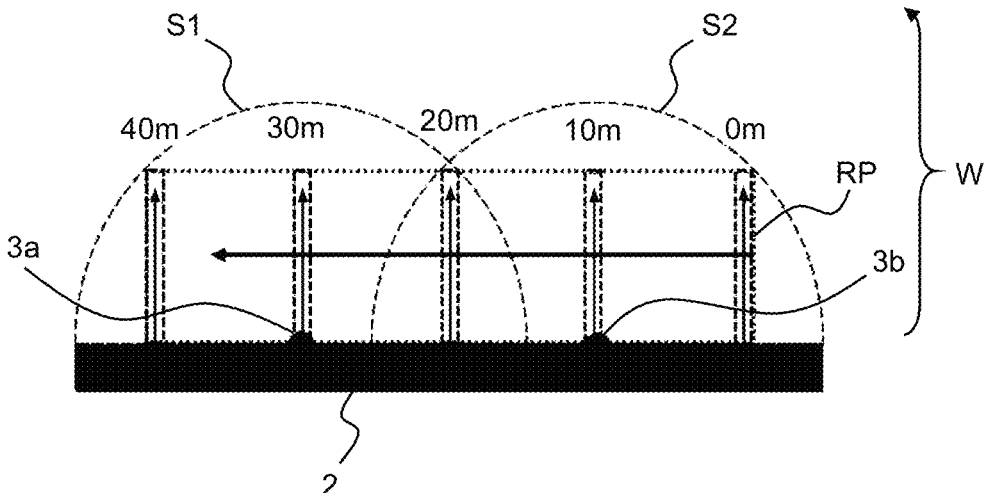
FIG. 3—Schematic diagram of two distance sensors on a quay wall and related reference areas.

FIG. 3 shows a Schematic diagram of two distance sensors 3a, 3b on a quay wall 2 and related reference areas. This is an example of the general setup of the proposed BAS.

FIG. 3 depicts two LiDAR sensors 3a, 3b each arranged to detect objects by reflected light in a respective sensor area S1, S2. The sensor areas S1, S2 overlap each other and provide a detection area. In the example five vertical and one horizontal (virtual) Reference Points RP are placed along the quay wall 2 extending from the quay wall 2 in the direction of the water area W.

The LiDAR Sensor detection range is shown by semi-circles S1, S2. Vertical arrows and boxes mark the position of vertical Reference Points RP, which measure distance in relation to a quay wall. Also, a horizontal Reference Point RP is shown, which measures the forward speed over ground SOG of a ship. This is also used to measure the distance to a stopping point (i.e., end of a berthing location). The dashed rectangle identifies the area for that the assistance installation BAS offers support.

The characteristics of the LiDAR Sensors 3a-c (i.e., opening angle, resolution, and supported distance), hull forms, and coatings as well as the environmental conditions (e.g., rain and snow) determine the size of this rectangle. The width of the Reference Point RP boxes determines the amount of LiDAR beam measurements to be considered for.

In this example, Reference Points RP have been placed in 10 m intervals on the quay wall 2 to support vessels 1 larger than 30 m. The position of these Reference Points RP also corresponds to meter marks along the quay. This physical mapping cases the pilots' orientation with respect to the electronically communicated values to the pilots PPU. Because berths in the harbor usually have fixed dimensions, a Reference Point at meter mark 0 m indicates where a ship has to stop. Due to a ship's mass and the resulting relatively long breaking distance, pilots and ship masters need to be informed early on how fast the ship is moving towards the end of the quay. Therefore, the definition of horizontal Reference Points RP sometimes also make sense, e.g., to ease precise Roll-On-Roll-Off (RoRo) ramp berthing.

FIG. 3 illustrates such a horizontal Reference Point RP at meter mark 0 m. Besides the ship length and its mass, the overall harbor layout, it's corresponding berthing areas, and also application-specific requirements are further aspects that determine the amount of the required Reference Points RP.

For instance, RoRo ramp berthing benefits from horizontal Reference Points, and crooked port areas and areas with strong currents or winds might require a higher density of Reference Points.

Finally, the amount of LiDAR sensors 3*a-c* and also their opening angle and resolution limits the amount of Reference Points RP.

Figure 4:
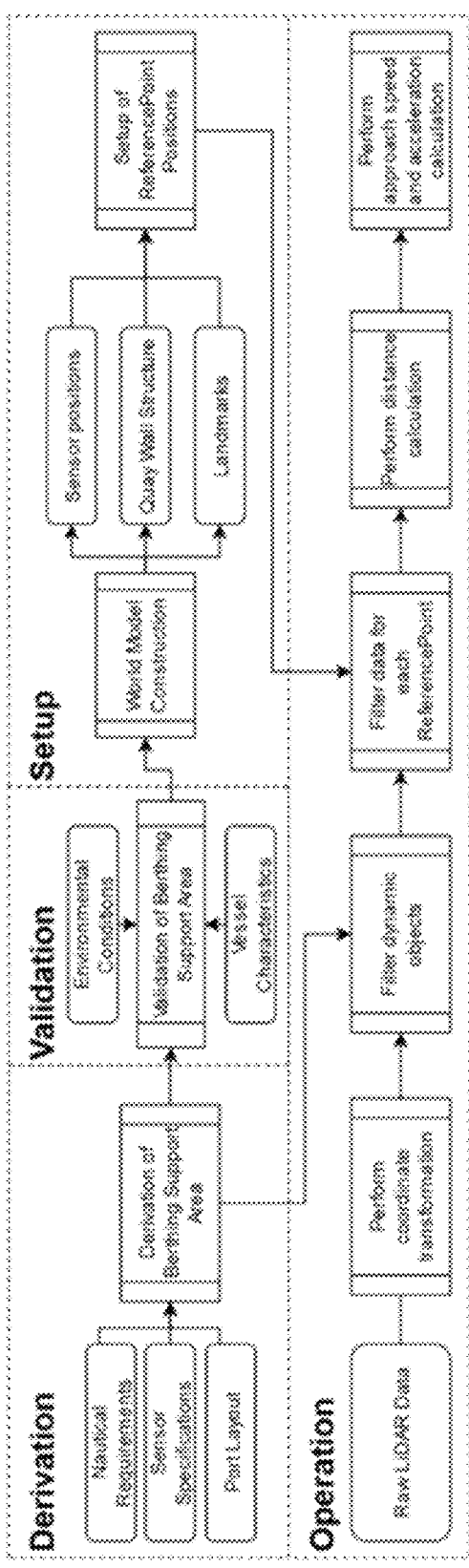
FIG. 4—Flow diagram for processing the LiDAR sensor data and determining the Berthing Support Area.

FIG. 4 is a Flow diagram for processing the LiDAR sensor data and determining the Berthing Support Area (BSA).

A Berthing Support Area (BSA) defines the precise geospatial area on a sea chart for which the BAS system offers support. Following the concept of the Operational Design Domain (ODD) from the automotive domain, this Support Area defines an area and a set of operating conditions in which the assistance system is specified to function.

It can generally be understood as a well-defined polygon $A_{poly}$ covering the berthing area and its immediate surroundings and a set of constraints C on parameters. The parameters considered here consist of the sets $P_{control}$, $P_{construction}$, and $P_{environmental}$.

The set $P_{control}$ contains all parameters that define the control of a vessel 1 (e.g., the speed over ground, the heading, or the distance to the quay wall). The parameters that are defined by the general construction of the ship, for example the hull size and coating, are defined in the set $P_{construction}$. Moreover, the set $P_{environmental}$ contains all parameters that are defined by the environment. These parameters are for example the current visibility, tide, winds, or currents. These sets of parameters are not fixed and must be adapted to the local circumstances and intended use of the system.

The total set of relevant parameters $P_{constraints}$ for possible constraints results from the union of these sets. A constraint $c_p \in$ C on $p \in P_{constraints}$ is the restriction of such a parameter. For numeric parameters, these are validity intervals, and for corresponding categorical parameters, sets of valid values. With these the validity of the BSA comes down to:

BSA is valid $\Longleftrightarrow \forall c_p \in$ C: p.value $\in c_p \lor$ ship.hull $\subset A_{poly}$ To derive a specific BSA and thus the polygon $A_{poly}$ and all constraints on the set of parameters $P_{constraints}$ to finally gain a running BAS, we propose a BSA derivation and operation process, which is depicted by FIG. 4.

The port layout (e.g., quay size and layout, and accessibility) together with the nautical requirements (port specific speed limits, and pilots and shipmasters' demands for support area e.g., based on relevant situation awareness criteria) can be used to derive an initial polygon. Based on the ideal polygon requirements, suitable sensors (e.g., LiDAR or short-range radar) can be selected and the corresponding sensor specifications (e.g., opening a measurement distance and precision) might confine the size of the ideal polygon and also constrain the $P_{construction}$ and $P_{control}$ parameters (e.g., opening angles and sensor position) based on realizations of $P_{environment}$ (e.g., visibility for LiDAR).

A basic mathematical model can be used to determine that the sensors are able to sense the vessel within the BAS and within pre-defined $P_{control}$ constraints (e.g., common berthing angles). For the resulting BSA, a world model of the berthing location (i.e., quay) is created that stores the sensor positions, relevant quay wall structures and landmarks (that are used by the ship masters and pilots for orientation) in a global coordinate system.

The BSA can be validated by a simulation with respect to relevant $P_{construction}$ sets and corresponding constraints are derived. Finally, Reference Points can be manually set in the computer-aided world model based on pilots' and shipmasters' demands (e.g., Reference Points attached to meter marks, fenders, or other relevant landmarks used for orientation during the berthing process).

Regarding the operation phase, the first step is the acquisition of the raw sensor data. These measurements are converted to X, Y, and Z points using a coordinate transformation and a global coordinate system is established.

After this step, a filter process is applied to the resulting point clouds. Because a Berthing Support Area was derived in the creation process, the LiDAR points can be filtered with respect to that. As a result, only points located within the Berthing Support Area are further processed.

The next step is the filtering of LiDAR points for each Reference Point. Based on the structure of these, the dimensions of a filter area were defined. This is used to filter data points for each Reference Point. For each filtered data point, the perpendicular distance to the Reference Point is calculated. Then the point with the minimal distance to the Reference Point is chosen. Changes in distance are used to calculate approach speed and acceleration.

The assistance installation can be implemented in a Shore-Based Berthing Aid Support BAS. In this, a shore-based laser system for the detection and support of berthing maneuvers of seagoing vessels can be used, which focuses on a shore-based infrastructure to support pilots and nautical personnel on a ship's bridge. Based on laser sensors, a situational picture of the berthing process should prevent accidents and damage to port infrastructure.

Besides LiDAR sensors, further sensors can be implemented to observe a docking area such as AIS, video cameras, and sensors to collect environment-related data such as weather and visibility. During berthing, these data are transferred via a mobile network to the pilot's PPU, which visualizes a sea chart with a vessel's hull form (i.e., the pre-filtered LiDAR points) together with the perpendicular distance, approach speed, and acceleration for each Reference Point.

For example, 2D LiDAR sensors from company SICK (LD-LRS 3611) can be used. The LD-LRS 3611 provides a maximum detection distance of 250 m at 90% remission with an opening angle of 360°. These sensors can be configured to operate, for example, at 5 Hz, with an angle resolution of 0.125° and an opening angle of 300°. Because the ships are moving relatively slowly, we trade scanning frequency for a higher angular resolution to improve the recognition of smaller vessels. Measurements of these sensors are collected using two sensor processing units.

These sensor processing units can be equipped with an Industrial PC (IPC), backup battery, and a network switch. Their task is to aggregate data from all sensors (AIS, camera, environmental, and LiDAR) and to process these in a distributed setup. To keep the latency between a sensor and IPC low, everything is connected via ethernet cables. Each sensor's processing unit runs the implementation based on a real-time multi-sensor framework. Using this, data from multiple sensors can be recorded, displayed and saved with highly accurate, synchronized timestamps.

At least one of these processing units can be equipped also with a mobile communication router (e.g. LTE/4G, 5G or LoraWAN), to establish a radio data communication unit enabling information transfer to the ship by use of a mobile network.

Data transfer from processing units to pilots on the ship can be realized using the text-based Message Queuing Telemetry Transport (MQTT) protocol. This allows the use of web sockets in addition to supporting a high bandwidth of end devices.

In order to create a reliable Berthing Support Area BAS, an area in which the BAS can provide support is defined. In this area, the functional safety of the assistance installation can be safeguarded. The size of this area is significantly influenced by how well a vessel 1 is detected by the LiDAR sensors 3a-c, measured by the point density of the LiDAR sensors 3a-c. If only a few points are available for a ship, these can also be considered as point outliers. In the worst case, an object is not detected at all.

Therefore, in order to define the area, influencing factors for the distance sensors 3a-c must first be defined. These can be subdivided into hardware limitations and environmental influences. The former is defined by the installed components (i.e., laser) and is reflected in the sensor specifications (i.e., range at 10% remission).

Regarding environmental influences, precipitation and visibility (e.g., fog) are named in most cases, which limit the maximum range of the distance sensors 3a-c. Furthermore, the point density for the detection of an object is influenced by the angle between the object and the LiDAR sensor 3a-c, due to the angular resolution of the device. If the hull of the object is at a right angle to the sensor beam, many points are reflected while the density decreases as the angle gets smaller.

The specification of the sensors and the angle between the sensor and the ship defines the Berthing Support Area BSA. The possible illumination of vessels is considered to be based on the sensor specification and setup. The influence of environmental conditions on LiDAR sensors is difficult to estimate and depends on the sensor model. Therefore, the influence of weather is difficult to measure.

In the following, the geometric model on which the BSA is based is described. Starting from a sensor at position $p_{sens}=(x_{sens}, y_{sens})$ and a ship side surface at position $p_{ship}=x_{ship}, y_{ship}$ with an angle of attack $\alpha$. The equation for the approximated hull is thus defined as:

$$\overrightarrow{hull} = \begin{pmatrix} x_{ship} \\ y_{ship} \end{pmatrix} + \lambda * \begin{pmatrix} \cos(\alpha) \\ \sin(\alpha) \end{pmatrix}$$

The two points hull$_1$ and hull$_2$ around $p_{ship}$ are now defined on this linear equation by choosing the following values for $\lambda$.

$$\lambda_1 = \frac{n}{2*\sin(\alpha)} \text{ and } \lambda_2 = \frac{n}{2*\sin(\alpha)}$$

By choosing the $\lambda$ values, the two points now have the property of a fixed distance of n meters in the y-dimension. This is chosen because the Reference Points PR have a width of n meters and are defined for this model along the y-axis.

Figure 5:
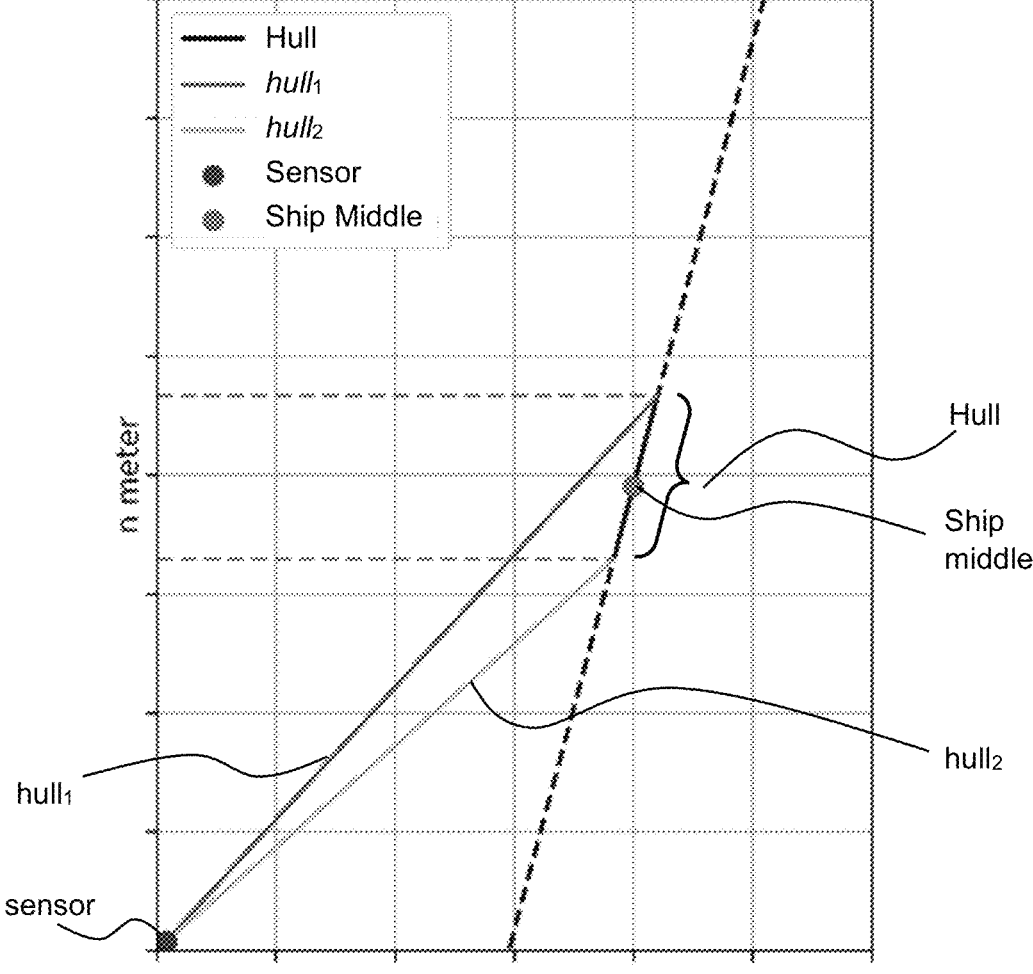
FIG. 5—Diagram of the relationship between sensor position, ship-angle and section width.

This relationship is visible in FIG. 5 showing a diagram of the relationship between sensor position, ship-angle and section width.

As a criterion for safety, a minimum number of M points is therefore required, which fall within the range of a Reference Point RP. That is why it is beneficial to determine how many sensor beams can actually hit the n-meter wide Reference Point optically. For the number of sensor beams, the angular resolution $\omega$ of the sensor and the angle opened between the two hull points and the sensor are of interest.

Starting from the sensor, the direction vectors to the two hull points are therefore as follows and the angle $\delta$ results from this to:

$$\overrightarrow{l_1} = \left( \begin{pmatrix} x_{\lambda_1} \\ y_{\lambda_1} \end{pmatrix} - \begin{pmatrix} x_{sens} \\ y_{sens} \end{pmatrix} \right) \text{ and } \overrightarrow{l_2} = \left( \begin{pmatrix} x_{\lambda_2} \\ y_{\lambda_2} \end{pmatrix} - \begin{pmatrix} x_{sens} \\ y_{sens} \end{pmatrix} \right)$$

$$\delta = \cos^{-1}\left( \frac{\overrightarrow{l_1} * \overrightarrow{l_2}}{|\overrightarrow{l_1}| * |\overrightarrow{l_2}|} \right)$$

From num_rays=$\delta/\omega$, the number of rays hitting the ship's hull at position $p_{ship}$ in an n meter section along the y-axis at an angle of a degrees to the quay wall can be derived. By performing this calculation over a grid of positions, a map with the corresponding number of possible rays can be created for each position.

This approach allows it to create a contour map for an area depending on application angles, sensor positions, and section widths. Depending on the desired safety level, the contour can now be exported for the required minimum number of beams and used as a polygon in the further process.

Further, in the described embodiment, a World Model can be generated. Regarding the data processing pipeline, a model of the quay wall from the raw LiDAR data is extracted in a first step and the Reference Points PR are set. For this, a box filter is used to extract the points which define the quay wall. These are then processed by a concave hull algorithm to compute a polygon of the quay wall. Thus, only the outer hull of these points is used to define the quay wall geometry. This model is then used to set Reference Points PR along the quay wall 2.

The data processing pipeline for live LiDAR data comprises a first step implemented in a computer program carried out by a data processor, which is connected to the sensors to read the data from all the sensors 3a, 3b, 3c, ... 3x. These sensors 3a, 3b, 3c, ... 3x send an array of distances, which are transformed to points to create point clouds. After this, using coordinate transformation, all point clouds are aligned relative to each other to create a global coordinate system.

This results in that a quay wall, ships, and fixed infrastructure can clearly be identified. Fixed infrastructure can be marked by coloured (e.g. red) boxes, while the quay wall is outlined using other colored (e.g. green) boxes.

After the filtering process, only points of ships are left.

After this step, the LiDAR measurements are synchronized on a temporal level. Because multiple sensors are used for the Berthing Support Area BAS, the measurement must be time synchronized.

For this, the sensors can operate, for example, in 5 Hz intervals. For time synchronization, a time window is defined of, for example 200 ms, so that older measurements are discarded if the difference to the newest measurement is higher.

Point clouds are then further processed by Reference Points PR. The length of the box filter can be set, for example, at 120 m. This value is based on the specifications of our BSA calculation. The width of the Reference Point PR can be set, for example, to 5 m, as the ship under consideration has a length of 16 m. At least three Reference Points PR should be defined per ship length. This value compensates for gaps in the LiDAR data.

A higher width can thus compensate for larger gaps in point clouds. For the horizontal Reference Point RP, the same, for example, 120 m in length can also be defined, so that these correspond to the vertical Reference Points RP. The width extends over the entire quay and thus corresponds to, e.g. 120 m.

By defining at least three Reference Points PR per ship length the assistance installation is able to calculate berthing angles and rate of turn (ROT) based on the Reference Points PR. This can be ensured as long as the vessel is within the specified sensor range. As soon as the vessel is outside the Berthing Support Area BSA and thus outside the specifications, only two reference points could simultaneously detect the vessel.

If the vessel is positioned unfavorably to the sensor, it is therefore possible that the hull is not ideally hit and thus the structure of the vessel is briefly measured. Therefore, to improve detection for smaller ships, 3D LiDAR sensors should be applied. This would make it possible to reduce the outliers, because measurements are not only made on the horizontal plane.

For bigger vessels, these kind of LiDAR fluctuations would not be expected, so that the use of 1D or 2D LiDAR sensors is sufficient. Regardless of the point measurement errors, it remains a problem to use the sensor values directly to determine the speed.

The above described example of an assistance installation provides a ship-independent berthing assistance system based on LiDAR sensors. The concept of a Reference Point allows to arbitrarily place them on a berthing site e.g., to reflect typical landmarks that pilots typically used for orientation to during berthing. Placing vertical Reference Points along the quay wall allows to measure the distance to the quay wall and the approach speed. Horizontal Reference Points can be placed at the end of the berth to measure the approach distance and speed. To ensure functional safety, a Berthing Support Area is defined based on the port structure, sensor specifications, and pilotage requirements. The BSA is determined by a mathematical model and defines an area in which the support is provided by calculating the possible illumination of a target by LiDAR sensors.

Because of the high update frequency of the LiDAR sensors, small distance deviations result in high-speed deviations. Thus, the distance measurements are filtered beforehand to retrieve accurate speed calculations.

There are additional use cases for the assistance installations that can be covered. It allows not only to support pilots during berthing maneuvers, but also during casting off. In situations involving tug assistance, the assistance installation can also offer important data not only to the captain of the vessel but also to the skippers of the tugs, improving the coordination between vessel and tugboats.

Using multiple Reference Points, the heading of a ship and the rate of turn can also be determined. Warnings, for example, at high approach speeds or high rate of turns could also provide additional support. Therefore, captains and pilots should be warned about a possible danger to improve the safety of the berthing process.

Further use cases include support during approaching lock entrances or bridge crossings. The BSA can additionally be transferred to other LiDAR-based systems. Furthermore, it is also possible to integrate the system into a Berthing Planning System.

The virtual Reference Points PR are only loosely coupled with each other. Therefore, the system can be dynamically split if needed (e.g., dividing one berth into several), so that this flexibility supports harbor operators in the dynamic environment of the port. This is especially useful for unintended berths, where berth locations are dynamically allocated.

The assistance installation can also be used to solve the berth allocation and quay crane assignment problem. This berth procedure can be supported by partitioning the reference points to ensure a safe and efficient berthing process, in particular in case that the berth routine is partitioned into segments and a time slot is assigned to arriving vessels.

The invention claimed is:

1. An assistance installation for assisting vessels in maneuvering at berthings in a water area adjacent to a berth, comprising:

a sensor data processing unit, a plurality of distance sensors spaced apart along the berth and connected to the sensor data processing unit, a stationary radio data communication unit connected to the sensor data processing unit, environmental measurement sensors connected to the sensor data processing unit and adapted to measure one or more environmental conditions, wherein the one or more environmental conditions comprise wind, tide and water current, and a portable data processing unit comprising a display and a mobile radio data communication unit adapted for radio data communication with the stationary radio data communication unit, wherein one or more of the plurality of distance sensors are adapted to detect a group of reflection points at which a distance measurement signal emitted from a respective distance sensor is reflected by the vessel to be supported in measurement cycles, and to detect one or more reflection points of the group of reflection points as measurement points for an actual distance of the one or more reflection points from the respective distance sensor, wherein the sensor data processing unit is adapted to determine an actual distance of a vessel to be supported from the berth by filtering the measuring points detected by the distance sensors of the plurality of distance sensors in a measuring cycle, wherein the sensor data processing unit comprises a plurality of predefined and stored vertical reference points are virtually established along the berth in a measuring range detectable by the distance sensors of the plurality of distance sensors at a distance from one another at the berth, which reference points have an origin point and a reference measuring range with a reference length extending perpendicularly from the water area to a berthing point and a reference width oriented transversely thereto, and at least one predefined and stored horizontal reference point with an origin point and a reference measuring range having a reference length extending parallel to the berth and a reference width extending in a direction transverse to the berth, wherein the sensor data processing unit is adapted to evaluate only measuring points within a respective predetermined reference measuring range for the reference points and to filter the measuring points detected by the distance sensors for each vertical and horizontal reference point by calculating the perpendicular distance of each measurement point within the area defined by the reference point, and wherein the sensor data processing unit is adapted to determine the actual distance of the vessel from the associated origin point of the respective reference point as the distance of a measuring point in the area of a respective reference point with the smallest perpendicular distance to the origin point of the respective reference point, and wherein said portable data processing unit is arranged to display an actual position, orientation, and motion of the vessel with respect to the respective reference points, and of the measured environmental conditions, wherein the display is configured to be useable to assist in maneuvering of the vessel into the berth.

2. The assistance installation of claim 1, wherein a size of the reference measurement areas are variably adjusted depending on the environmental conditions measured with the environmental sensors, and wherein environmental condition data detected by the environmental condition sensors has an influence on the maneuvering behaviour of the vessel.

3. The assistance installation of claim 1, wherein the sensor data processing unit is adapted to determine a berthing support area as a spatial area in a water area adjacent to the berth from one or more of control parameters for the vessel to be assisted, design parameters of the vessel to be assisted, and environmental parameters.

4. The assistance installation of claim 1, wherein the sensor data processing unit is adapted to determine an approach speed and an approach acceleration of the vessel from a change in a sequence of measured actual distances to the respective reference points.

5. The assistance installation of claim 1, wherein the portable data processing unit is adapted to display a berthing location at the berth and the actual position and location of the vessel to be assisted from the actual distances, approach speeds and approach accelerations of the vessel to be assisted with respect to the respective reference points, wherein displayed data are transmitted to the portable data processing unit from the sensor data processing unit via the stationary radio data communication unit to the mobile radio data communication unit of the portable data processing unit.

6. The assistance installation of claim 1, wherein the assistance installation further comprises an Automatic-Identification-System (AIS) receiving unit for receiving AIS data of one or more vessels located in a vicinity of the assistance device for detecting the position, destination and characteristic of the respective vessel, and wherein the portable data processing unit is arranged for displaying the one or more vessels determined from the received AIS data with their respective positions and sailing directions.

7. The assistance installation of claim 1, wherein the berth is a quay wall in a harbour, ship canal or lock.

8. A method for assisting vessels in maneuvering at berthings in a water area adjacent to a berth by use of an assisting installation comprising a sensor data processing unit, a plurality of distance sensors spaced apart along the berth and connected to the sensor data processing unit, a stationary radio data communication unit connected to the sensor data processing unit, environmental measurement sensors connected to the sensor data processing unit and adapted to measure environmental conditions comprising one or more of wind, tide, and water current, and a portable data processing unit having a display and a mobile radio data communication unit adapted for radio data communication with the stationary radio data communication unit, comprising:

detecting a group of reflection points at which a distance measurement signal emitted from one or more distance sensors is reflected by the vessel to be supported to the one or more distance sensors;

using the sensor data processing unit to detect the reflection points as measurement points for an actual distance of a reflection point of the group of reflection points from the respective distance sensor;

determine the actual distance of the vessel to be supported from the berth by filtering the measuring points detected by the plurality of distance sensors in a measuring cycle, by virtually establishing and storing in the sensor data processing unit a plurality of vertical reference points along the berth in a measuring range detectable by the plurality of distance sensors at a distance from one another at the berth, which reference points comprise an origin point and a reference measuring range with a reference length extending perpendicularly from the water area to a berthing point and a reference width oriented transversely thereto, and at least one horizontal reference point with an origin point and a reference measuring range having a reference length extending parallel to the berth and a reference width extending in a direction transverse to the berth;

evaluate only those measuring points within a respective predetermined reference measuring range for the reference points;

filter the measuring points detected by the distance sensors for each stored vertical and horizontal reference point by calculating the perpendicular distance of each measurement point within the area defined by the reference point;

determine the actual distance of the vessel from the associated origin point of the respective reference point as the distance of a measuring point in the area of a respective reference point with the smallest perpendicular distance to the origin point respective reference point as the actual distance from the associated reference point; and display an actual position, orientation, and motion of the vessel, and of the measured environmental conditions, on the display of said portable data processing unit in a manner useable to assist in maneuvering of the vessel into the berth.

9. The method according to claim 8, further comprising the step of variably adjusting a size of the reference measurement areas as a function of environmental condition data provided by the environmental condition sensors which have an influence on the maneuvering behaviour of the vessel.

10. The method according to claim 8, further comprising the steps of determining a berthing support area as a spatial area in a water area adjacent to the berth from one or more of control parameters for the vessel to be assisted, design parameters of the vessel to be assisted, and environmental parameters, and displaying the determined berthing support area on the display of said portable data processing unit.

11. The method according to claim 8, further comprising the step of determining an approach speed and an approach acceleration of the vessel as a function of a change in a sequence of measured actual distances to the respective reference points.

12. The method according to claim 8, further comprising the step of displaying on the display of the portable data processing unit at least one of the group of a berthing location at the berth, and an actual position and location of the vessel to be assisted from the actual distances, approach speeds and approach accelerations of the vessel to be assisted with respect to the respective reference points, wherein displayed data on the display of the portable data processing unit are transmitted to the portable data processing unit from the sensor data processing unit via the stationary radio data communication unit to the mobile radio data communication unit of the portable data processing unit.

13. The method according to claim 8, further comprising the step of receiving Automatic-Identification-System (AIS) data of one or more vessels located in a vicinity of the assistance installation for detecting the position, destination and characteristic of the respective vessels, and displaying the one or more vessels determined from the received AIS data with their respective positions and sailing directions.

14. A method for assisting vessels in maneuvering at berthings in a water area adjacent to a berth by use of an assisting installation comprising a sensor data processing unit, a plurality of distance sensors spaced apart along the berth and connected to the sensor data processing unit, a stationary radio data communication unit connected to the sensor data processing unit, environmental measurement sensors connected to the sensor data processing unit and adapted to measure environmental conditions comprising one or more of wind, tide and water current, and a portable data processing unit having a display and a mobile radio data communication unit adapted for radio data communication with the stationary radio data communication unit, comprising:

measuring the environmental conditions with the environmental measurement sensors; and
 using the sensor data processing unit to
 variably adjust a size of reference measurement areas as a function of the measured environmental condition data having an influence on maneuvering behaviour of a vessel measured with the environmental sensors;
 determine a berthing support area as a spatial area in a water area adjacent to the berth from one or more of control parameters for the vessel to be assisted, design parameters of the vessel to be assisted, and environmental parameters, and displaying the determined berthing support area on the display of said portable data processing unit;

receive Automatic-Identification-System (AIS) data of one or more vessels located in a vicinity of the assistance installation for detecting a position, a destination and characteristic of the respective vessels;
 detect a group of reflection points at which a distance measurement signal emitted from one or more distance sensors of the plurality of distance sensors is reflected by the vessel to be supported;
 detect reflection points as measurement points for an actual distance of the reflection point from the respective distance sensor;
 determine an actual distance of the ship to be supported from the berth by filtering measuring points detected by the plurality of distance sensors in a measuring cycle, by virtually establishing and storing in the sensor data processing unit a plurality of vertical reference points along the berth in a measuring range detectable by the plurality of distance sensors at a distance from one another at the berth, which reference points have an origin point and a reference measuring range with a reference length extending perpendicularly from the water area to the berthing point and a reference width oriented transversely thereto, and at least one horizontal reference point with an origin point and a reference measuring range having a reference length extending parallel to the berth and a reference width extending in the direction transverse to the berth;
 evaluate only those measuring points within a respective predetermined reference measuring range for the reference points;
 filter the measuring points detected by the distance sensors for each stored vertical and horizontal reference point by calculating the perpendicular distance of each measurement point within the area defined by the reference point;
 determine the actual distance of the vessel from the associated origin point of the respective reference point as the distance of a measuring point in the area of a respective reference point with the smallest perpendicular distance to the origin point of the respective reference point as the actual distance from the associated reference point;
 determine an approach speed and an approach acceleration with respect to the reference points of the vessel as a function of a change in a sequence of measured actual distances to the respective reference points; and
 display on the display of said portable data processing unit one or more of the actual position, orientation and motion of the vessel, and the measured environmental conditions of a berthing location at the berth, actual distances, approach speeds and approach accelerations of the vessel to be assisted with respect to the respective reference points, and the one or more vessels determined from the received AIS data with their respective positions and sailing directions in a manner useable to assist in maneuvering of the vessel into the berth.

\* \* \* \* \*